Nov. 20, 1934.  E. R. SPIEGEL ET AL  1,981,290
ENGINE LUBRICATION
Filed Sept. 5, 1933  2 Sheets—Sheet 2
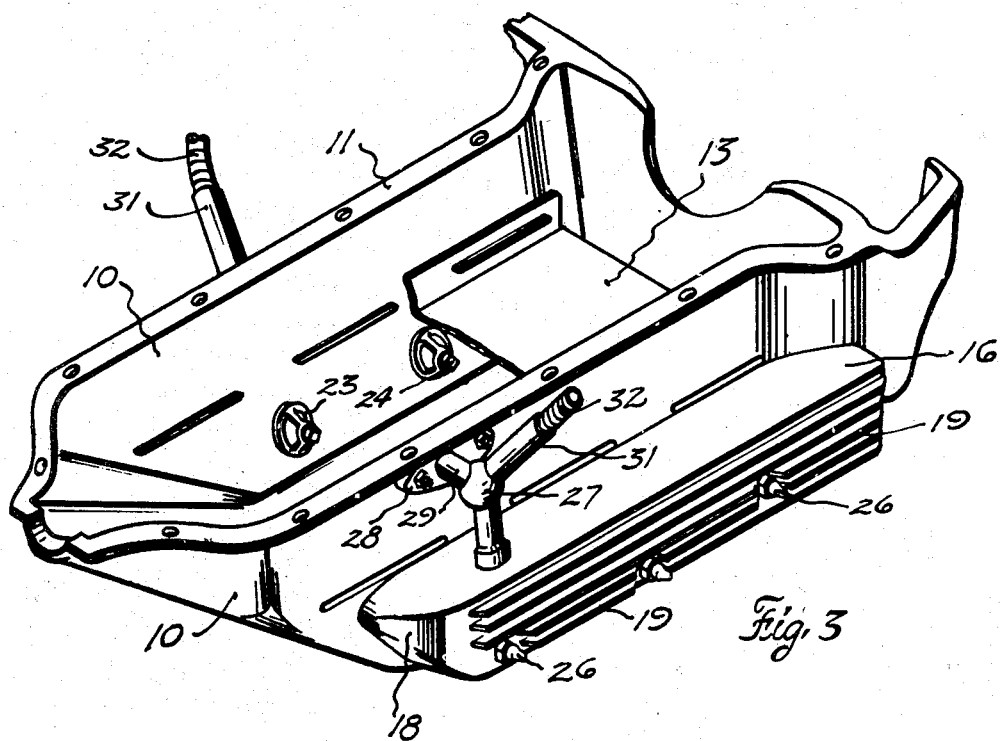
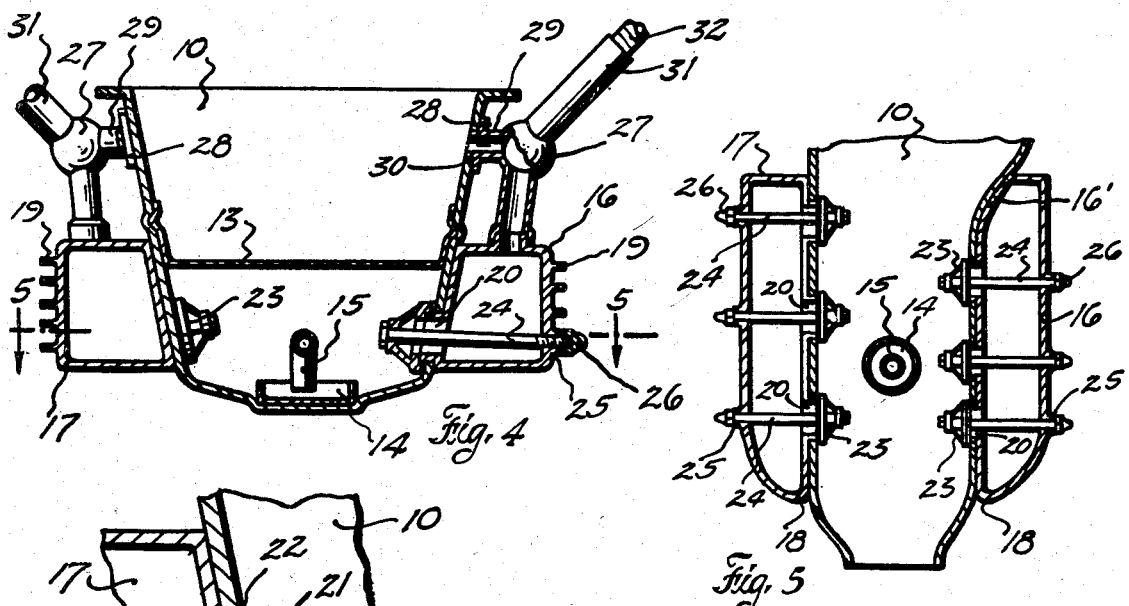
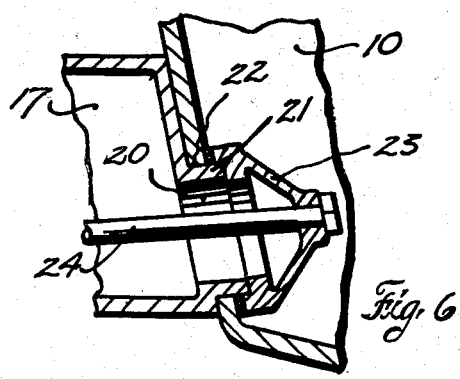
Inventor
Edward R. Spiegel
Wood Lee Wilson
By Jack A. Othley
Attorney Patented Nov. 20, 1934

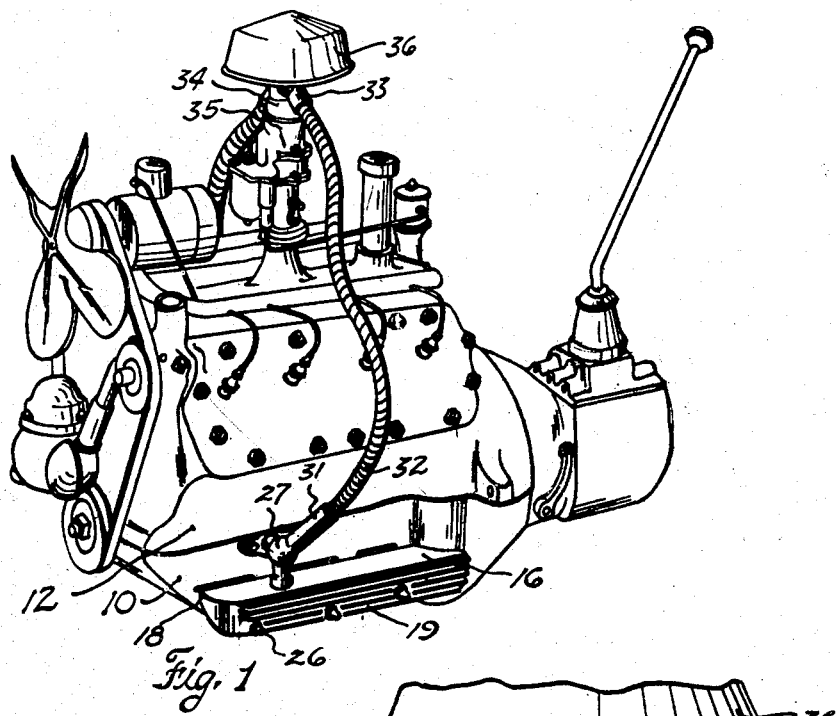
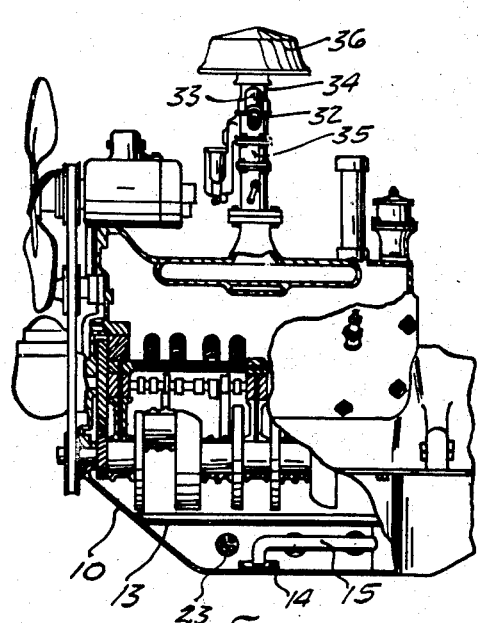
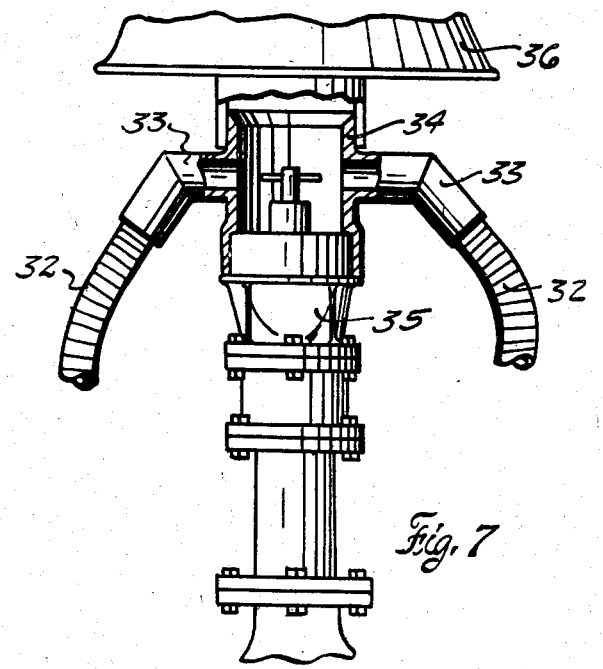

1,981,290

UNITED STATES PATENT OFFICE 1,981,290

ENGINE LUBRICATION

Edward R. Spiegel and Wood Lee Wilson, Dallas, Tex.

Application September 5, 1933, Serial No. 688,160

5 Claims. (Cl. 184—104)

This invention relates to new and useful improvements in engine lubrication.

The invention has more particularly to do with the lubricating system of an internal combustion engine and especially for engines which are operated at high speeds.

Modern engine lubrication has tended toward increasing the quantity of oil used. This has been brought about by the discovery that in order to properly lubricate the working parts, the oil must be circulated by means of a pump and owing to the high temperatures the oil is over-heated, particularly when the engine is operating at very high speeds. The hotter the oil becomes the thinner it gets and its lubricating value is proportionately reduced. By increasing the quantity of oil it is not necessary to circulate it so fast and the heat is dissipated to a greater extent thus keeping the oil cooler.

It has been discovered that certain metals, when used for oil containers, have different coefficients of heat radiation and a body of oil held in a receptacle of one kind of metal could be cooled more quickly than the same body of oil at the same temperature held in a receptacle of another kind of metal. Certain experiments have been made with motor vehicle engines in connection with the oil pan thereof. This oil pan is at the bottom and underneath the engine and vehicle and is usually made of sheet steel or other tough metal so that stones and pebbles cast up against it will not crack it or break it; and also to save it from injury when dragging over high road centers. Aluminum or copper has been found to be a more desirable metal because of its higher coefficient of heat radiation, but oil pans made of aluminum have not been practical because they will not withstand the impact of stones and rocks cast up by the wheels of the vehicle and are easily cracked or punctured, thereby causing leaks.

One of the objects of our invention is to provide an improved lubricating system, whereby the oil may be efficiently cooled and maintained at the proper working temperature without depending upon a greatly increased quantity of oil for accomplishing this purpose.

Another object of the invention is to provide a lubricating system in which the heat is radiated and the temperature of the circulating oil reduced, whereby its life is prolonged and it is prevented from breaking down in ordinary usage.

Still another object of the invention is to provide in connection with the cooling means suitable ventilation, whereby air pressures in the crank case and oil pan are relieved and also whereby oil vapors are introduced into the carburetor and the engine with the well known beneficial results.

An important object of the invention is to provide an oil pan in which the main body and bottom are made of hard tough metal, such as steel, and the oil cooling portions of the pan are elevated and are made of softer heat radiating metal, such as aluminum, whereby the latter are removed from the zone in which they are most likely to be injured.

A still further object of the invention is to provide an oil cooling chamber or receptacle which may be attached to an ordinary oil pan so as to be exposed to the air currents and for receiving and cooling the oil in the oil pan.

A construction designed to carry out the invention will be hereinafter described, together with other features of the invention.

The invention will be more readily understood from a reading of the following specification and by reference to the accompanying drawings in which an example of the invention is shown, and wherein:

Figure 1 is a perspective view of a motor vehicle engine equipped with a lubricating system constructed in accordance with the invention, Figure 2 is a side view of the same, partly in elevation and partly in vertical section, Figure 3 is a perspective view of the engine oil pan equipped with cooling chambers constructed in accordance with the invention, Figure 4 is a transverse vertical sectional view of the same, Figure 5 is a horizontal cross-sectional view taken on the line 5—5 of Figure 4, Figure 6 is a detail of one of the chamber fastening devices, and Figure 7 is a detail showing the carburetor connection for the ventilating elements.

In the drawings the numeral 10 designates the oil pan of a motor vehicle engine. It is customary to make this pan of sheet steel. The reason for this is that the bottom of the pan is the lowest part of the entire engine and if it is dragged over high road centers it is not as likely to crack or break as a cast metal pan. A sheet metal pan will dent or bend and thus rocks and stones cast against it by the wheels will not crack or puncture it, as has occurred where cast metal pans are used. However, the invention is not to be limited to a sheet steel pan, as the pan may be made of any hard metal and in any suitable manner.

The pan has a flange 11 at its top by which it is secured to the crank case 12 of the engine. A flanged tray or splash sheet 13 is fitted in the pan at about mid-height thereof. This tray is preferably made removable and snugly engages the sides and front of the pan. It is customary to mount the engine in the frame of the automobile with a slight rearward inclination and this causes the tray to incline rearwardly. As is shown in Figure 3, the tray terminates short of the rear end of the pan so that the oil will be discharged into the reservoir formed in the pan below said tray. At about the central portion of the bottom of the pan an oil sump 14 (Figures 2, 4 and 5) is located. The inlet end of the suction pipe 15 of the oil pump (not shown) depends into the sump and draws oil therefrom. When the pump is operating the oil in the pan is drawn from all directions towards said sump.

In carrying out the invention, auxiliary cooling chambers or oil receptacles 16 and 17 are mounted on the sides of the oil pan 10 and elevated above the bottom thereof so as not to strike on high road centers and to be more or less out of the way of rocks and pebbles thrown under the pan. We prefer to form these chambers of cast aluminum, copper, or other similar material having a high coefficient of heat radiation. These chambers have a general rectangular shape in cross-section, except that their inner sides are inclined so as to lie flat against the sides of the pan 10. The forward end of each chamber is rounded and shaped into a more or less blunt point or nose 18 so as to reduce the wind resistance and also to induce the air currents to travel along the top, side and bottom of each chamber when the vehicle is in motion.

Each chamber is substantially the same, except that the chamber 16 has its inner upright wall curved at 16' to conform to the curvature of the oil pan at the rear portion thereof, as is best shown in Figures 3 and 5. On the outer wall of each chamber longitudinal radiating fins 19 are provided. The location of these fins is subject to considerable variation and they may be placed on such surfaces as is found desirable. Radiating fins in themselves are well known in the art and they are used to expedite heat radiation.

The chambers may be fastened to the oil pan in any suitable manner and the invention is in no wise limited to the shape or size of the chambers or their manner of connection with the oil pan 10. It is preferable to provide a plurality of openings 20 spaced along the inner wall of each chamber and at the bottom thereof and to surround each opening with a short collar or nipple 21, as is best shown in Figures 4, 5 and 6. The nipples are inserted in close fitting openings 22 in the inclined sides of the pan so as to project into the latter. By this arrangement communication is established between the oil reservoir below the tray 13 and the chambers. For fastening the chambers, spiders 23 are engaged over the inner ends of the collars for receiving the heads of bolts 24 which extend through the chambers and project through bosses 25 on the outer walls thereof. Cap nuts 26 mounted on the outer ends of the bolts are employed to fasten the chambers in place, as will be clear from an observation of the drawings.

It will be noticed that the openings 20 on one side of the pan are not opposite the openings 20 on the opposite side of the pan, and also that the openings are located both forwardly and rearwardly of the sump 14. The action of the pump in drawing the oil toward the sump 14 and the side sway of the vehicle will cause the oil to flow through the openings 20 transversely of the pan and the chambers and thereby set up a circulation. Further as the oil is heated in the pan it will be displaced by the cooler oil in the chambers. It is obvious that as the hot oil flows into the chambers its heat will be rapidly dissipated because of the nature of the metal of these chambers and the passage of air currents along the outer surfaces thereof. This structure will maintain the oil at a proper working temperature and many degrees Fahrenheit lower than it would be retained in the pan 10.

It is quite obvious that air would be trapped in the upper portions of the chambers 16 and 17 and further it is desirable to ventilate the oil pan so that the crank case may properly breathe while the engine is operating. Above each chamber a spherical manifold 27 is provided. The manifold is connected with a flange 28 by a short pipe or extension 29. The flange is fastened to the side of the oil pan above the tray 13 so that the oil vapors may freely pass through an opening 30 in the pan to each manifold 27.

Each manifold has an upwardly extending tubular shank 31, which receives the lower end of a flexible pipe or metallic hose 32. Each pipe 32 has its upper end inserted in an elbow 33 connected in a collar 34. The collar 34 is mounted on top of the air intake of the carburetor 35 and supports the usual air cleaner 36. It will be obvious that oil vapors will be drawn from the oil pan and the chambers through the pipe 32 to the carburetor. These vapors will be introduced into the combustion chamber of the engine and will lubricate the top piston rings and the valves. It is found that by carrying off the vapors from the crank case, pressure is relieved therein, thus reducing the tendency of oil leaks at the front and rear main bearings. Also, oil vapors passing through the carburetor tend to seal the needle valve and prevent raw gas from entering the engine.

Extensive tests which have been made with this invention prove a number of important advantages. In one test in which a light weight V-8 cylinder engine was equipped with the invention, it was found that the crank case temperature was reduced about 60° F. so that the oil was kept much cooler and did not break down under ordinary usage. In this particular test the oil pan held five quarts of oil and by adding the chambers the capacity was increased to eight quarts of oil. This increased capacity, coupled with the cooling feature, reduced the speed of oil circulation nearly fifty per cent. The oil mileage, meaning the miles traveled without adding oil, was increased from seventy-five to one hundred and fifty per cent, depending upon the speeds at which the vehicle was driven. Where piston rings had been burnt out owing to high oil temperatures and excessive circulation speeds, an examination showed that none of the rings had been damaged during the test, which extended over a period of several thousand miles. Where it had been necessary to change the oil every five hundred miles, the same brand and grade of oil was run two thousand miles without change. An inspection of the engine manifested a wide difference in the temperatures of the oil pan body 10 and the chambers 16 and 17. The chambers were found to be many degrees cooler than the oil pan body.

The description which has been given recites more or less detail of a particular embodiment of the invention, which is set forth as new and useful; however, we desire it understood that the invention is not limited to such exact details of construction because it is manifest that changes and modifications may be made within the scope of the appended claims, without departing from the spirit of the invention.

What we claim and desire to secure by Letters Patent, is:

1. Lubricating oil cooling means for an internal combustion engine including its oil pan, comprising a pair of lubricant chambers, one on each side of the oil pan and both arranged above the plane of the bottom of the pan, and each having communicating ducts through which lubricating oil will, circulate between the oil pan and said lubricant chambers.

2. A lubricating oil cooling means in accordance with claim 1 in which the lubricant chambers each have a plurality of ducts opening laterally into the oil pan with the ducts on the two sides being in a staggered relationship with respect to each other.

3. A lubricating oil cooling means in accordance with claim 1 in which the lubricant chambers are each "stream-lined" and provided with heat radiating fins extending longitudinally rearwardly from the front ends of the chambers.

4. A lubricating oil cooling means in accordance with claim 1 in which the oil pan has a plurality of side openings on each side and nipples surrounding and extending outwardly from these openings, and the lubricant chambers each have corresponding openings which will receive the outwardly extending nipples on the oil pan, and means for securing said chambers to the pan including spiders over said openings in the pan, and bolts connected to said spiders and extending through the opposite sides of the lubricant chamber.

5. A lubricating oil cooling means in accordance with claim 1 in which the said chambers each have a conduit leading from the upper portion thereof and communicating with the pan above the chambers and also with a conduit for carrying off and discharging gases therefrom.

EDWARD R. SPIEGEL.
WOOD LEE WILSON.